United States Patent
Bultykhanova

[11] Patent Number: 6,087,009
[45] Date of Patent: Jul. 11, 2000

[54] SURFACE TREATING METHODS

[75] Inventor: Natalia Bultykhanova, Gablonzer Ring 98, 87600 Kaufbeuren, Germany

[73] Assignee: Natalia Bultykhanova, Kaufbeuren, Germany

[21] Appl. No.: 08/919,096

[22] Filed: Aug. 28, 1997

[30] Foreign Application Priority Data

Aug. 28, 1996 [DE] Germany .......................... 196 34 859

[51] Int. Cl.[7] ..................................................... B32B 27/00

[52] U.S. Cl. ...................... 428/421; 427/307; 427/523; 427/525; 428/422; 428/463

[58] Field of Search ...................................... 428/421, 422, 428/463, 523, 525, 307

[56] References Cited

U.S. PATENT DOCUMENTS

| 5,366,590 | 11/1994 | Kadomura | 216/80 X |
| 5,702,773 | 12/1997 | Endo | 427/525 X |
| 5,789,041 | 8/1998 | Franzen | 427/523 |

Primary Examiner—Michael Lusignan

[57] ABSTRACT

There is disclosed a method of treating running faces subjected to wear of a workpiece in which ions or molecule chain components of fluorocarbon molecules are arranged on the surface of the workpiece. It is especially preferred to attach ions of polyfluoroether molecules. The attachment can be effected by adhesion or by chemical bonding. Principally the method according to the invention can be applied to metallic and ceramic materials, wherein especially good experiences have been made with the surface treatment of aluminum workpieces, ceramic inserts etc.

22 Claims, 10 Drawing Sheets

SURFACE TREATING METHODS

BACKGROUND OF THE INVENTION

1. Field of the Invention

The invention relates to a method of treating the surfaces of workpieces which are made in particular of metallic or ceramic materials, to a workpiece, mirror, rolling bearing, etc. treated according to such method and a lubricant for running faces of such workpieces, etc.

2. Discussion of the Background

Especially in the automotive and aircraft industry for reducing the fuel consumption efforts are made to manufacture as many components as possible of light metal alloys in order to save weight. During the past few years, considerable pains have been taken to manufacture also parts of internal combustion engines, turbines and the pumps used, for instance fuel pumps, of light metal alloys. When using light metal alloys, particular difficulties arise on wearing faces on which two components are slidingly moved, as this is the case, for instance, with cylinders and pistons of internal combustion engines or with a casing and the rotor of an oil pump supported in said casing, for example of an internal geared wheel pump.

In the case of the steel alloys used for such purposes so far the sections subjected to wear could be protected against premature wear by appropriate surface treatment methods such as case hardening or by applying a wearing layer (Nikasil®).

With light metal alloys such surface treatment methods are difficult to execute. For instance in DE 195 19 535 A1 a method of machining cylinder running faces of internal combustion engines is suggested in which the wearing faces made of an aluminum silicon alloy are pretreated by a laser in a nitrogen environment so that on the surface of the pretreated workpiece an aluminum nitride layer having a sufficient wear resistance is formed. For such a method considerable apparatus costs are required due to the lasers to be employed and in large-scale production this method is difficult to master so that cheaper solutions are continued to be searched for.

The application of other wearing layers (Nikasil®) also incurs considerable manufacturing and apparatus costs so that such coatings are used merely in heavy-duty engines, while such solutions are not feasible in large-scale production due to high costs.

OBJECTS OF THE INVENTION

Compared to this, one object underlying the present invention is to provide a method of treating the surfaces of workpieces, etc. as well as workpieces, etc. treated according to such method and a lubricant for such workpieces, etc. (hereinafter "workpieces" refers to all substrates) by which a premature wear can be prevented at minimum apparatus costs.

By the method according to the invention one chemically or physically attaches fluorocarbon molecules, especially the ions of polyfluoroether molecules, to the matrix of the base material of which the workpiece is made, an ion or molecule layer preventing, e.g. in the case of a sliding pairing, the surfaces of the workpieces from directly sliding against each other is formed on the surface of the workpiece.

In this case a molecular surface layer is concerned so that the dimensional stability of the workpiece is in no way modified. It turned out during the prior examinations carried out within the scope of the development of the present invention that the molecules or ions do not necessarily remain at the position to which they have initially become attached, but that, in case the workpiece is subjected to wear, an ion or molecule is removed from its first position of attachment and becomes attached to another position of the surface of the workpiece so that always the formation of a molecule/ion layer on the surface of the workpiece is ensured and thus a premature wear can be counteracted. The attachment of the molecules and/or ions can be effected by chemical bond or by adhesion depending on the materials used (material of the workpiece, type of molecule).

Ions of the type $CF^+$, $C_2F^+$, $CF_3^+$, $C_2F_4^+$, $C_2F_5^+$, $C_3F_5^+$, $C_3F_6^+$, $C_3F_7^+$, $CFO^-$, $CF_3O^-$, $C_2F_3O_2^-$, $C_3F_5O^-$, $C_3F_5O_2^-$ (in general: $C_mF_n^+$ (m, n≧1); $C_aF_bO_c^-$, (a,b,c≧1)) have turned out to be especially well suited.

The polyfluoroether molecules may also include oxygen or hydrogen groups at side chains.

In order to distribute the ion/molecule coating evenly, a shearing force can be applied to the surface-treated workpiece after the attachment of the ions/molecules, for instance by subjecting the workpiece to a sliding stress so that the ions are evenly distributed in the above-described manner over the surface subjected to wear.

A particularly good adhesion of the ion/molecule layer is obtained, if the attaching step is preceded by a cleaning and/or drying step by which the surface of the workpiece is conditioned.

An especially even distribution of the ion/molecule layer with a minimum layer thickness is obtained, if the fluorocarbon molecules are applied in diluted form.

The surface treatment of the workpiece is advantageously executed in a plasma chamber in which a carrier gas and the fluorocarbon molecules can be ionized. Nitrogen, carbon dioxide, methane, oxygen or an inert gas are especially suited for the use as carrier gas for pretreating the workpiece, wherein the ionized carrier gas acts about 1–60 minutes on the workpiece and in the plasma chamber a pressure of less than 1 bar and a temperature of more than 20° C. are adjusted.

If the sliding faces are to be additionally protected against wear by lubricants, the lubricant should be selected such that the attached ion/molecule cannot be detached from the surface of the workpiece by the lubricant per semiconductor. In special applications it may be advantageous to add to the lubricant a lubricant additive which permits the detachment of the molecule/ion from the surface of the workpiece. This lubricant additive is adjusted, however, in such a way that the detached molecule/ion is attached, out of the lubricant, to another position of the surface of the workpiece so that practically a self-regenerating protective layer is provided which prevents a direct contact of the workpiece faces sliding against each other.

The method according to the invention can be used especially advantageously in workpieces made of aluminum alloys, for instance in cylinder running faces or casings and rotors of pumps, wherein particularly good results are obtained with aluminum alloys having a silicon content of less than 13% by weight.

Another applicability of the method according to the invention is given with mirrors, especially the mirrors of space telescopes in which the mirror layer is provided with a molecule/ion layer according to the invention so that an oxidation of the reflection layer can be prevented.

The wear and the friction of rolling bearings can be further reduced, if the rolling bodies are pretreated by the method according to the invention. Thereby, for instance, the power required to drive a shaft supported by such a bearing can be reduced.

It is especially advantageous, if recesses for enlarging the attaching face are formed in the surface of the workpiece.

As already mentioned in the foregoing, the invention also includes a lubricant having a lubricant additive which permits the detachment from and again the attachment of the molecules/ions to the surface of the workpiece. Such a lubricant would be suited, for example, only for use in engines the sliding faces of which provided with a lubricant were pretreated by the method according to the invention and thus have a fluorocarbon molecule/ion layer.

BRIEF DESCRIPTION OF THE DRAWINGS

Other advantageous embodiments of the invention are provided in the other subclaims. In the following several examples of application of the invention will be described in more detail by way of schematic drawings, wherein

Figure 1:
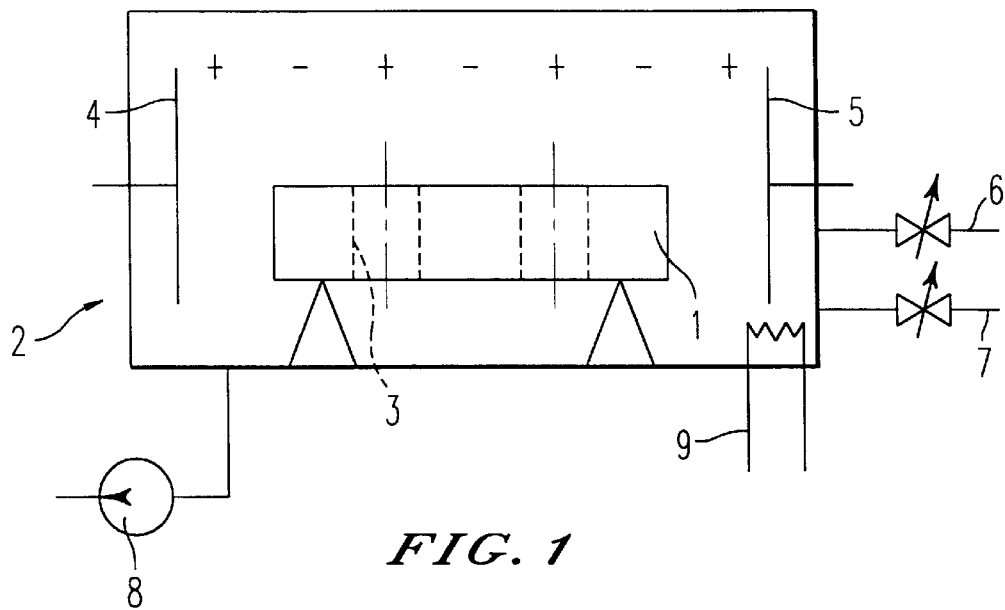
FIG. 1 shows a schematic view of a plasma chamber for executing the method.

In the following, an embodiment will be described in which the method according to the invention is used for a surface-treatment of cylinder running faces of an engine block of an internal combustion engine made of an aluminum alloy. I.e., in this example a workpiece whose material matrix substantially contains aluminum-silicon compounds is treated. The method according to the invention can also be used with other materials and workpieces, of course. As already aforementioned, for instance the rotors and casings of oil pumps, cup tappets of the valve actuation of internal combustion engines and other sliding pairings exposed to wear can be pretreated by the method according to the invention, wherein such components may be manufactured of any metallic material, such as, e.g., the above-mentioned aluminum alloys, grey cast iron etc., steel or ceramic materials.

Another field of application of the method according to the invention is the pretreatment of cutting ceramics, for instance of $Al_2O_3$, wherein it has turned out that the wear of the pretreated tools can be reduced to a fraction vis-à-vis an untreated tool surface by applying the method according to the invention.

Further fields of application of the method according to the invention will be described in more detail in the following, the list of the fields of application being in no case final.

In the method described as follows the engine block 1 manufactured of an aluminum silicon alloy (Si content<13%) is introduced into a plasma chamber 2 in which the surface treatment is performed. The cylinder running face 3 to be treated (broken line in FIG. 1) has to be arranged, if possible, in the plasma chamber 2 in such a way that the ionized gases are unhindered when penetrating the cylinder bores.

The plasma chamber 2 has the usual structure so that, to simplify things, in the following only the substantial components will be described and regarding further details reference is made to the existing technical literature. For ionizing the gas provided in the plasma chamber 2 the latter comprises two electrodes 4, 5 by which the direct current required for ionizing the gases or a high-frequency alternate current can be applied.

The gases are supplied through supply lines 6, 7, wherein, for instance, carrier gases and conditioning gases such as nitrogen, carbon dioxide, methane, oxygen or inert gases can be supplied to said supply line 6. Through the supply line 7 the fluorocarbon according to the invention is introduced, wherein in the illustrated embodiment gases containing polyfluoroether are supplied, which are either supplied in a predetermined concentration mixed with a carrier gas or else mixed in or before the plasma chamber by appropriate adjustment of the volume flows in the supply lines 6, 7 so that in the plasma chamber 2 a predetermined concentration of carrier gas and/or polyfluoroether molecules can be adjusted.

The plasma chamber 2 is moreover provided with a pump 8, preferably a vacuum pump, and a heat exchanger 9 by which predetermined operating conditions can be adjusted inside the plasma chamber 2. In the illustrated embodiment inside the plasma chamber a slight vacuum of, e.g., 0.5 bar and a temperature of, e.g., 120° C. is adjusted. The supplied process gas (carrier gas, fluorocarbon, especially polyfluoroether) is disintegrated into its ions by applying the voltage to the electrodes 4, 5 so that the ions are applied to the outer circumferential faces of the engine block 1. These operating conditions adjusted in such way are constantly maintained for a predetermined period of time, wherein the temperature, the pressure and the gas concentration are permanently controlled and regulated in the plasma chamber 2 so that constant operating conditions are ensured. The duration of exposure of the ionized gas is dependent, inter alia, on the material of the workpiece—here the engine block I —and on the structural complexity of the workpiece, very irregular workpiece geometries requiring a longer exposure time to enable the ionized gas to become evenly attached to the surface of the workpiece.

Figure 2:
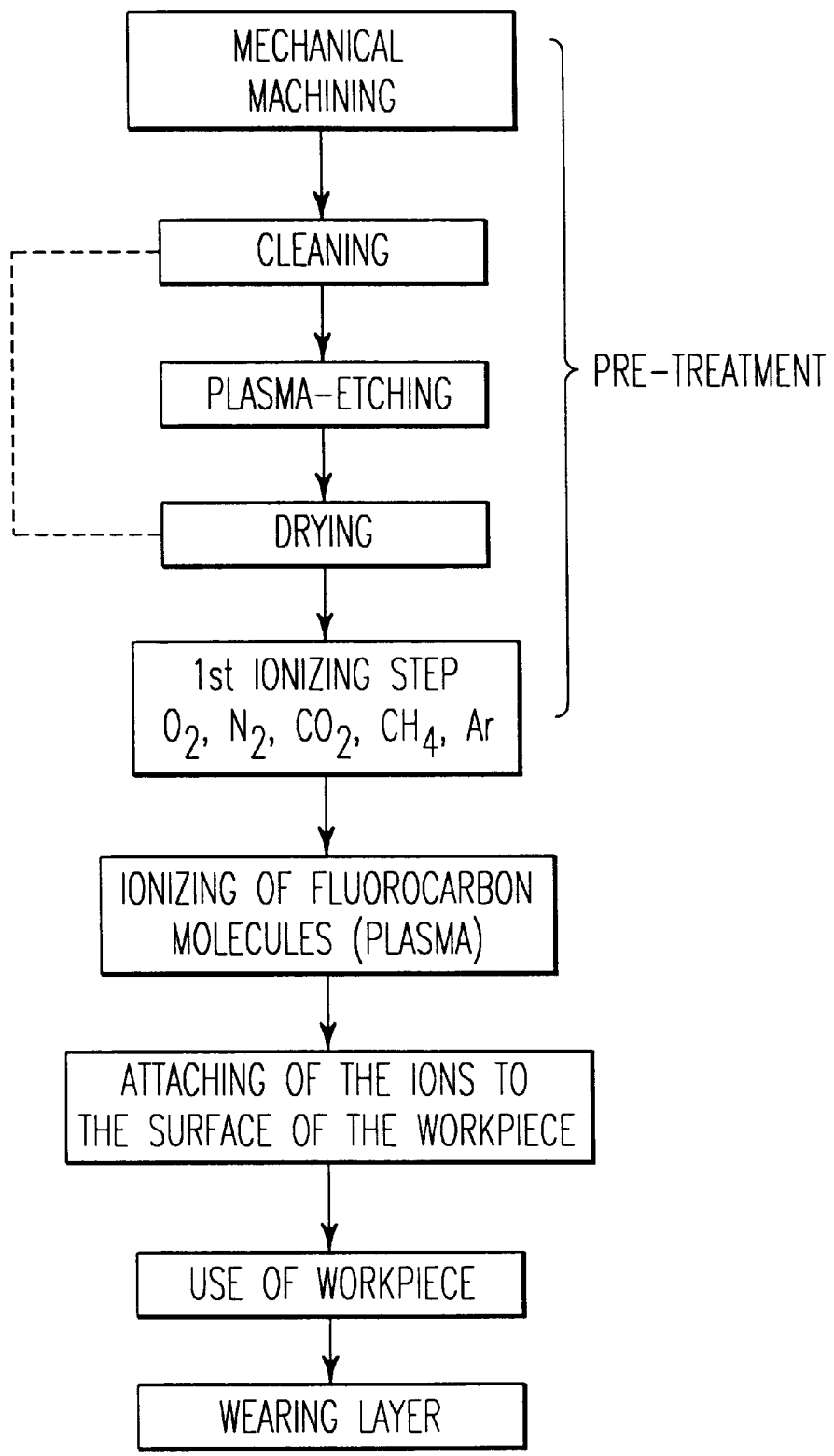
FIG. 2 shows a flow chart of a method according to the invention.

In FIG. 2 a flow chart of an embodiment of a method according to the invention for the pretreatment of a surface of the engine block 1 is illustrated. Accordingly, the engine block 1 is first manufactured to size in step SO, this manufacturing to size being possible because by the surface treatment according to the invention merely a protective layer having a thickness of a molecule is applied so that no adaptation of the nominal size including allowance is required.

After manufacturing the engine block 1, it is cleaned by a suitable method (step S2), wherein, for example, appropriate cleaning agents can be applied.

As indicated by step S3, in addition or as an alternative to the cleaning step S2, in which a cleaning agent is applied, a pretreatment of the surface of the workpiece by plasma etching (S3) can be effected, wherein the plasma etching operation can be carried out in the plasma chamber shown in FIG. 1. Depending on the material of the workpiece subject to pretreatment, gases the ions of which detach possible impurities or oxide layers on the surface of the workpiece are supplied via the lines 6, 7 so that a highly purified surface quality is produced.

The cleaning step is usually followed by a drying step S4 in which the cleaning agent is removed from the surface of the workpiece.

In case that the workpiece has not been subjected to a plasma etching step (S3), the workpiece is introduced after the cleaning/drying step (S2, S4) into the plasma chamber shown in FIG. 1, and oxygen which is ionized in the plasma chamber 2 is supplied via the supply line 6. Instead of oxygen, also other gases such as, for instance, nitrogen, carbon dioxide, methane or inert gases can be employed.

In the case of aluminum cylinder blocks 1, however, in the step S5 preferably oxygen or another oxidizing gas is supplied so that on the surface of the workpiece oxide structures having a predetermined composition and a predetermined layer thickness are formed which are exactly adjustable by the operating conditions (concentration of the process gas, temperature, pressure). After a predetermined exposure time of these ions the pretreatment of the cylinder block 1 is completed.

Following this, the actual surface treatment of the workpiece is effected in which the fluorocarbons to which carrier gas has been added are supplied via the supply line 7, wherein —as already mentioned above—polyfluoroether molecules are preferred (step S6). After adjusting the predetermined operating conditions inside the plasma chamber 2 (step S7), a voltage is applied to the electrodes 4, 5 so that the polyfluoroether molecules of the type $(CF_2CF_2)_nO(CF_2CF_2)m$ are split into their ions, positive ions of the type $CF^+$(molecular weight 31), $C_2F^+$(molecular weight 43), $CF_3^+$(molecular weight 69), $C_2F_4^+$(molecular weight 100), $C_2F_5^+$ (molecular weight 119), $C_3F_5^+$(molecular weight 131), $C_3F_6^+$(molecular weight 150) and $C_3F_7^+$(molecular weight 169) being formed. The plasma chamber moreover contains negative ions of the type $CFO^-$(molecular weight 47), $CF_3O^-$(molecular weight 85), $C_2F_3O_2^-$(molecular weight 135), $C_2F_5O^-$(molecular weight 147) and $C_3F_5O_2^-$ (molecular weight 163).

In case a different fluorocarbon is used, of course also other ions of the general formula $C_nF_m+(m, n \geq 1)$ and $C_aF_bO_c-(a,b,c \geq 1)$ can be formed.

The ions and molecule chain components formed in this way preferably become attached to the aluminum oxide surface produced in step S5, the $Al^-O$ bond being broken up so that the ions and molecule chain components become attached to the $Al^+$ and $O^-$ atoms of the material matrix. In this case a chemical bond is concerned. However, it is also possible that the ions become attached to the surface of the workpiece by adsorption.

After a predetermined exposure time which may be 1–60 minutes depending on the material and geometry of the workpiece, the ionized gas components are pumped off and the pretreated workpiece is removed from the plasma chamber 2.

Surprisingly enough, it turned out in the preliminary tests that by the distribution of the attached ions/molecule chain components, i.e. when the cylinder running faces during operation of the engine are subjected to stress (for example by shear forces), the ions/molecule chains are sheared off their original (after the plasma treatment) bonding positions and subsequently become attached to a different position of the running face again so that, for instance, ions of surface areas having a high covering density are transferred to areas having a low covering density. By this constant change of the covering structure during the use of the workpiece also uncovered surface areas are provided with an ion/molecule cover again so that practically a "self-healing" effect is brought about preventing that during use uncovered areas are occurring with the risk that the metallic surfaces of the workpiece are sliding directly against each other and thus are subjected to premature wear.

Since in this way the ion/molecule layer is evened out during the use of the workpiece, the actual wearing layer is formed—as indicated in step S9—only during the use of the workpiece. This is a substantial difference from the conventional methods in which the applied layers are worn during the use of the workpiece and usually have to be applied again by an appropriate subsequent treatment.

In the afore-described embodiment it was assumed that the ions/molecule chain components break up the aluminum oxide bond and become appropriately attached. As, however, metallic surfaces are inhomogenous as a rule and, depending on the alloying component, also $Si^+$, $O^+$, $Al^-$, $H^+$ions etc. are accessible in the workpiece matrix, the method according to the invention can also be used for workpieces having no oxide layer.

Figure 3:
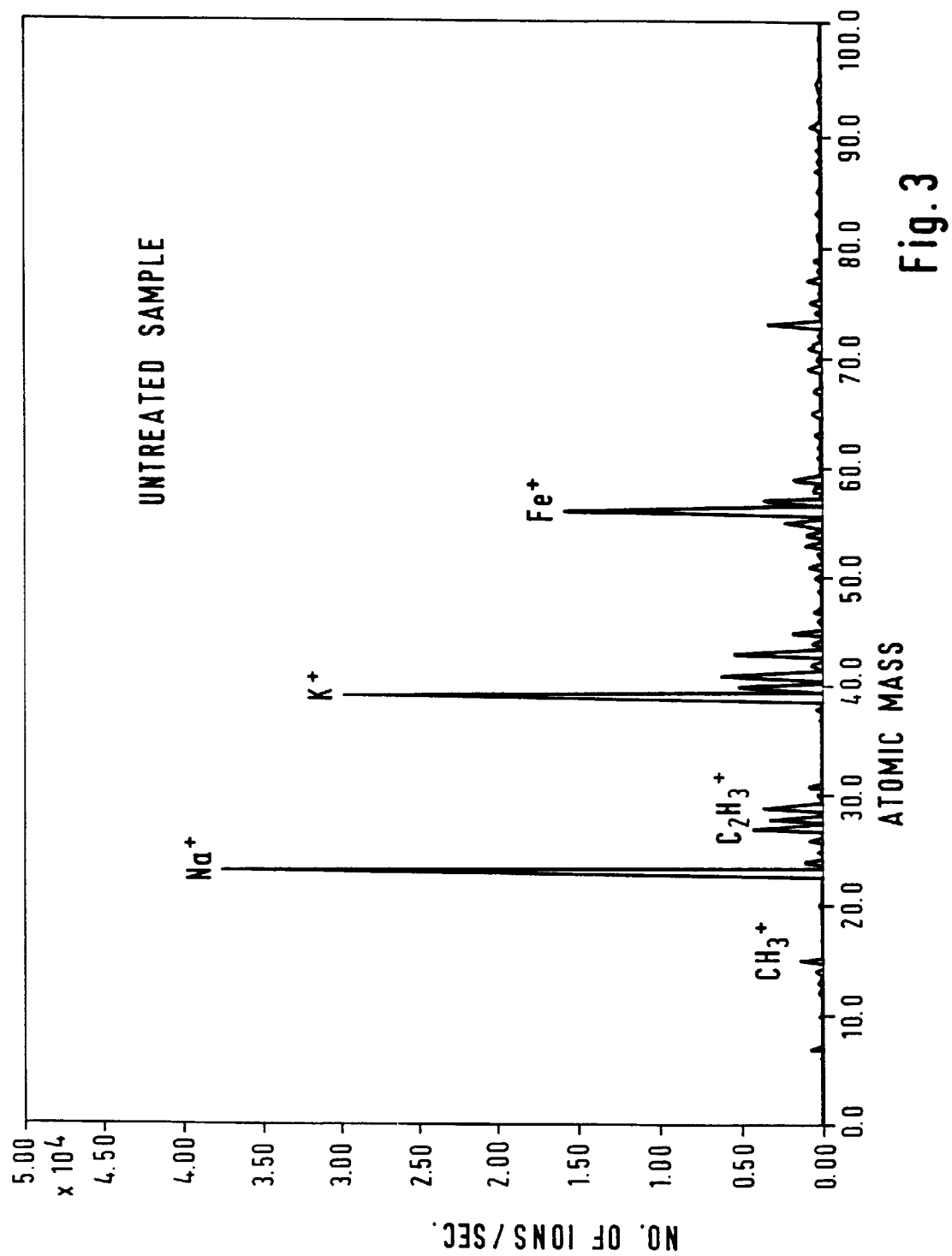
FIGS. 3 and 4 show atomic mass spectrums of an untreated sample of a workpiece.
Figure 4:
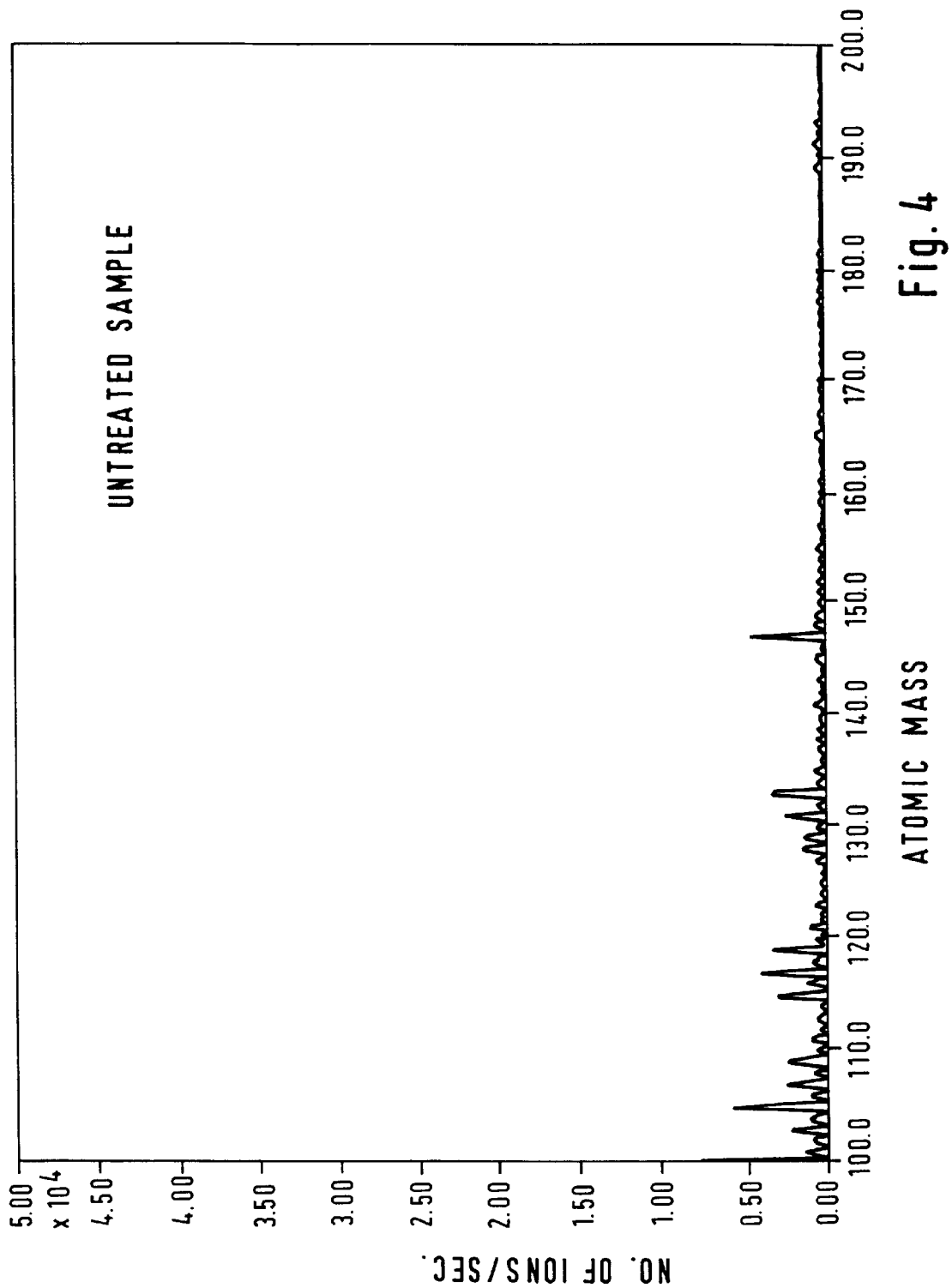
Figure 5:
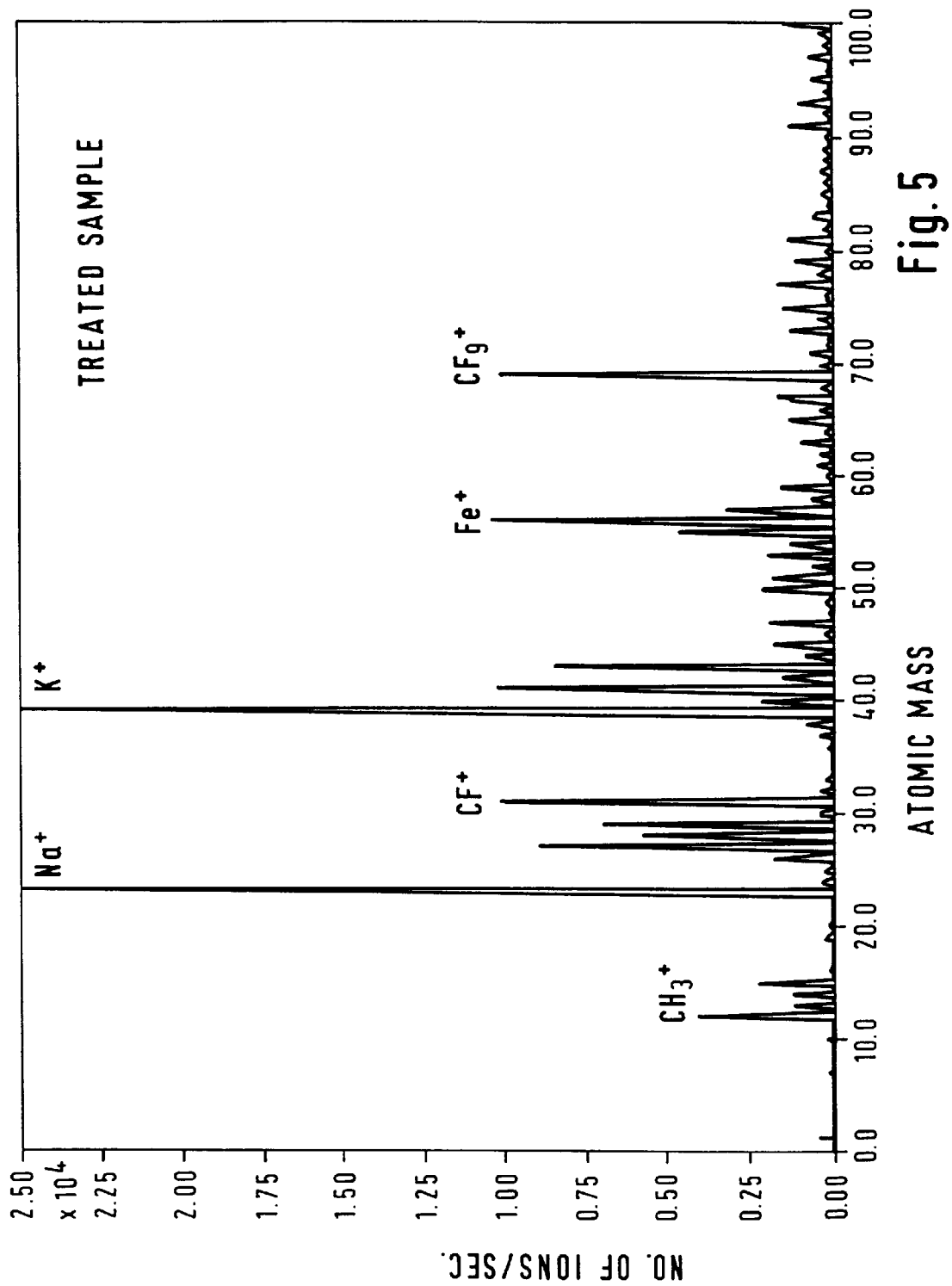
FIGS. 5 and 6 show atomic mass spectrums of a sample of a workpiece subjected to surface-treatment according to the method of the invention.
Figure 6:
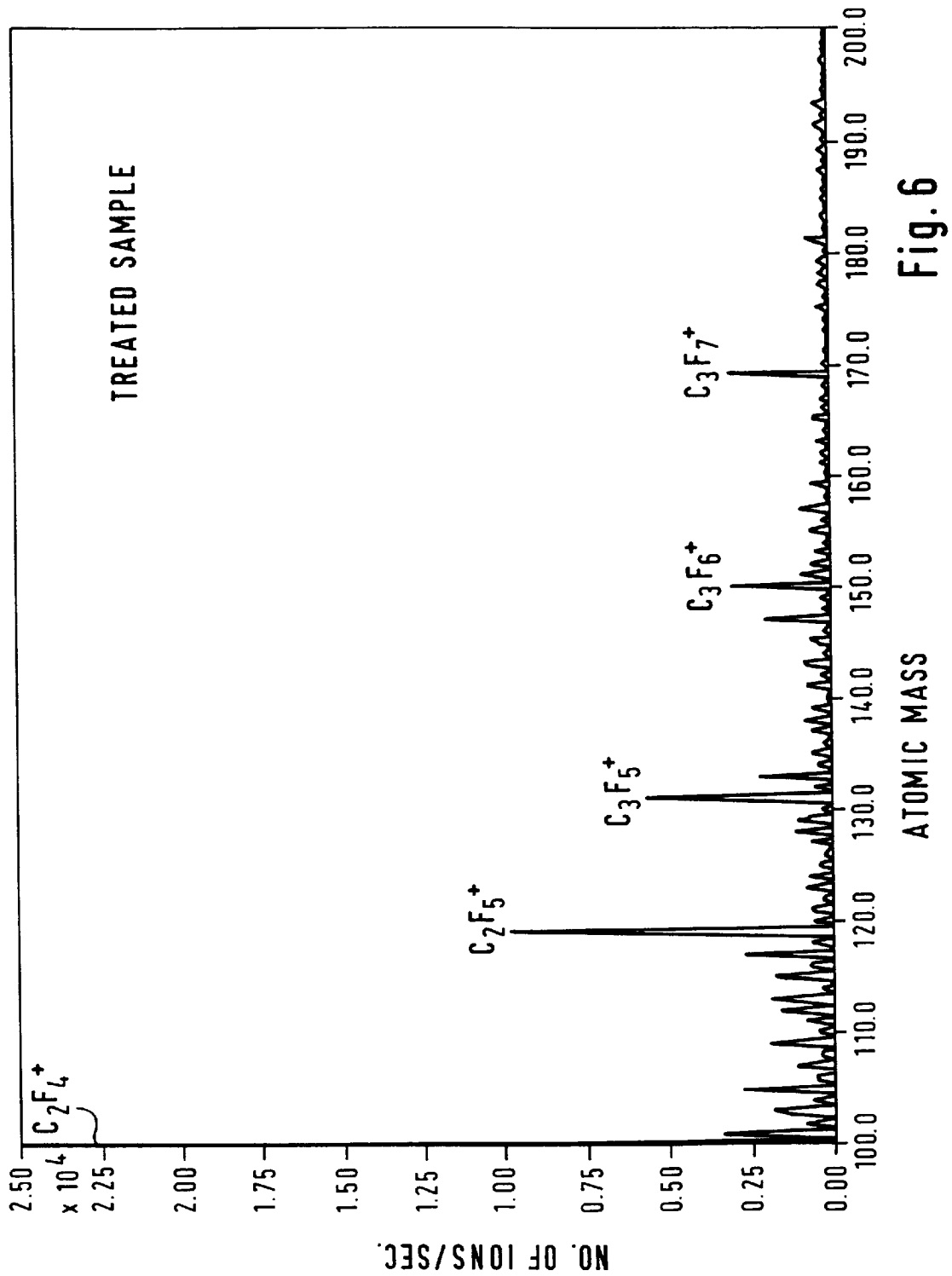

In the FIGS. 3 to 6 results of a secondary ion mass spectrometry (SIMS) are represented, wherein in FIGS. 3 and 4 the spectrums of an untreated sample of a workpiece made of a steel alloy being shown and in FIGS. 5, 6 the spectrums of a sample of the same alloy treated according to the method of the invention are shown.

The SIMS method is a method of examining the surfaces of solids, the surface of the sample being bombarded with an ion beam (O, Cl, argon etc.) in a high vacuum, thereby ionized particles being ejected from the surface. These secondary ions are analyzed as usual in mass spectroscopy. The SIMS method can be carried out such that individual layers of the surface of the sample can be successively abraded and analyzed, wherefrom one can get an idea not only of the composition but also of the distribution of the components, for instance in the alloy. The SIMS can also be controlled by adapting the primary ion beam such that the method is executed practically free of destruction so that only the uppermost layer of the workpiece is affected. As regards further details of the SIMS method, reference is made to the existing technical literature.

In each of the FIGS. 3 to 6 the number of the ions detected per second is illustrated with respect to the atomic weight (atomic mass). As can be deduced from FIGS. 3 and 4, the atomic mass spectrum of the untreated sample contains merely ions as they usually occur in steel compounds: for example $Na^+$, $SF^+$, $K^+$, various hydrocarbon compounds, $CH_3^+$, $C_2H_3^+$ etc.

The atomic mass spectrums of the surface-treated sample, on the other hand, also contain, apart from the ions already established in the untreated sample, fluorine-containing ions and molecule chain components so that, accordingly, the surface-treated sample substantially differs from the untreated sample as regards the composition. It is noted in this context that the composition to be taken from the FIGS. 5 and 6 is usually formed only on the uppermost material layer.

Figure 7:
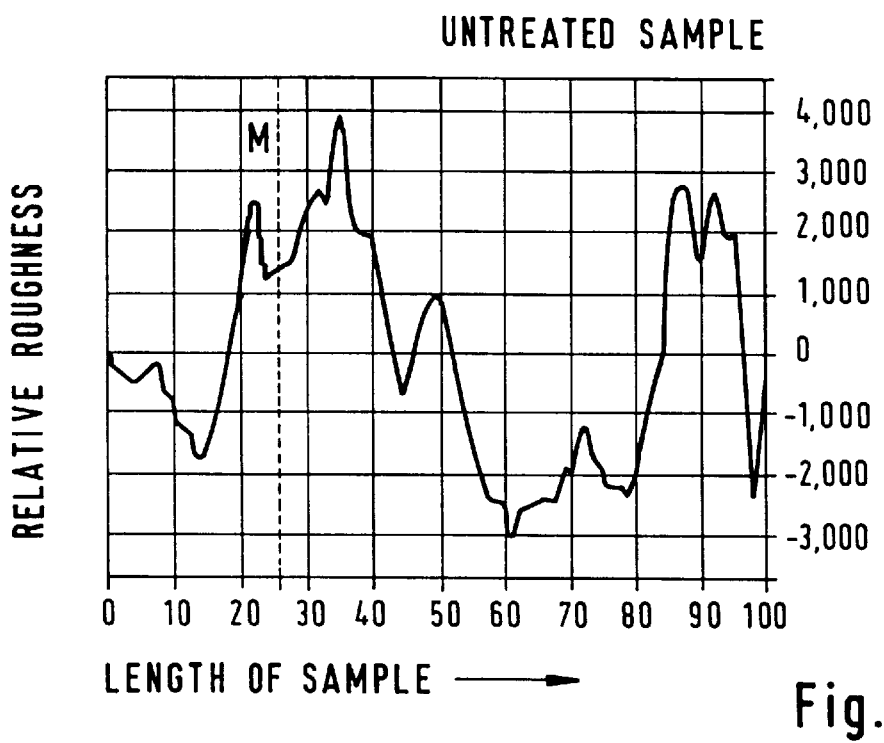
FIG. 7 shows the surface profile of an untreated sample of a workpiece.
Figure 8:
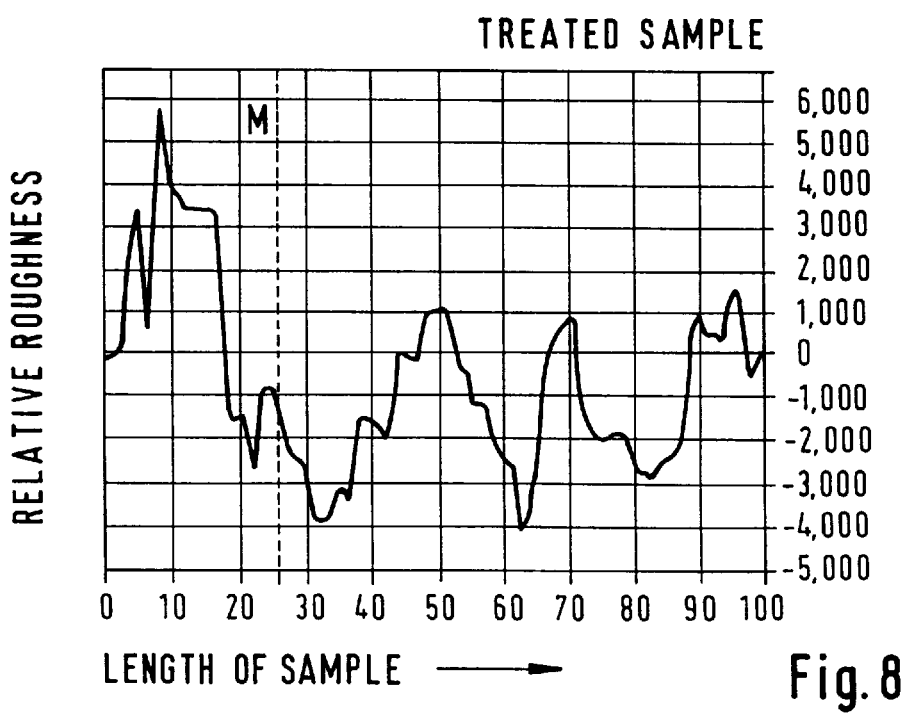
FIG. 8 shows the surface profile of a sample of a workpiece subjected to surface-treatment according to the method of the invention.

In the FIGS. 7 and 8 the surface profiles of an untreated sample made of a steel alloy (FIG. 7) and of a surface-treated steel sample having the same composition and being manufactured according to the same method are illustrated.

It is resulting therefrom that the surface roughness of both samples shows no substantial difference, wherefrom it can be concluded that the attached ions/molecule chain components are applied merely in the thickness of a molecule so that the surface roughnesses of the workpieces remain almost unchanged and thus also a dimensional stability is ensured after the surface treatment.

With a practical use of the cylinder running faces pretreated according to the invention it turned out that, when using coated aluminum pistons with conventional steel rings, even at full load after a quite long time practically no important wear is measurable on the surface-treated cylinder running faces so that the method according to the invention opens very interesting possibilities from the tribological point-of-view.

The service life of the surface-treated workpieces can even be prolonged, when a lubricant mixed with a lubricant additive which permits a detachment of the ions/molecule chain components from the surface of the workpiece is employed. The lubricant itself, i.e. without lubricant additive, is not suited to detach the ions/molecule chain components. By this lubricant additive the "self-healing" effect is increased so that ions/molecule chain components can be detached during operation and become attached to other positions of the workpiece surface again so that the surface layer is constantly regenerated. Under certain circumstances, it may be advantageous, if molecule chain components of the fluorocarbon—for instance polyfluoroether—are added already to the lubricant itself so that the regeneration of the wearing layer can be improved.

By the use of the method according to the invention and possibly by using the lubricant according to the invention thus the wear between two pairings of materials sliding against each other can be considerably reduced so that, for instance, in the case of internal combustion engines a substantially lower consumption is brought about due to the reduced internal friction. The fuel saved can amount to several percent compared to conventional engines. It is interesting that frequently it is sufficient when only one part of the sliding pairing is subjected to a surface-treatment.

As mentioned already in the foregoing, the method according to the invention is by no means restricted to the use in connection with aluminum or steel alloys.

Preliminary tests carried out by the inventor show that also ceramic materials (silicate-ceramic materials, oxide-ceramic materials, nonoxide-ceramic materials) can be successfully pretreated by the method according to the invention in order to increase the service life of tools made of such materials, e.g. drills.

Figure 9:
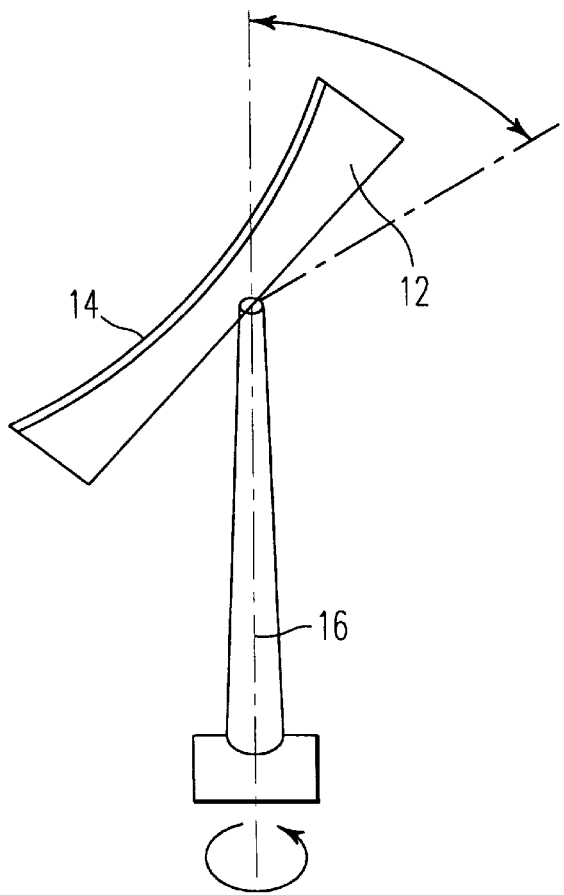
FIG. 9 shows a schematic view of a reflecting telescope subjected to surface-treatment according to the method of the invention.

FIG. 9 shows another example of application of the method according to the invention. In the case of reflecting telescopes which can have a diameter of more than five meter, as principal mirror 12 concave carrier members vaporized with a reflection layer 14 of highest grade aluminum are used. After the vaporizing operation the reflection layer 14 is exposed to atmospheric oxygen, wherein an aluminum oxide layer considerably reducing the reflection capacity of the principal mirror 12 and thus the performance of the reflecting telescope is formed on the aluminum.

Surprisingly enough, it has been found out now that by a surface treatment according to the invention of the reflection layer 14 this oxidation can be prevented so that the reflecting capacity occurring directly after the vaporizing operation can practically be maintained and thus the performance of the reflecting telescope can be improved by minimum efforts and costs compared to conventional solutions.

Another problem of such reflecting telescopes is to support the principal mirror 12 in an appropriate manner so that it is rotatable about its vertical axis 16 and can be tilted by a predetermined angle with respect to the vertical axis 16 (indicated by a broken line in FIG. 9). Since such principal mirrors 12 have a considerable weight and an extremely precise alignment of the reflecting telescope with respect to the object to be observed is required, high demands are made to the support of the principal mirror 12. In some designs the principal mirror 12 is supported by packings of ball bearings, wherein, surprisingly enough, it turned out that the actuating forces required for adjusting the principal mirror 12 can be substantially reduced by a surface treatment according to the invention of the rolling members.

Figure 10:
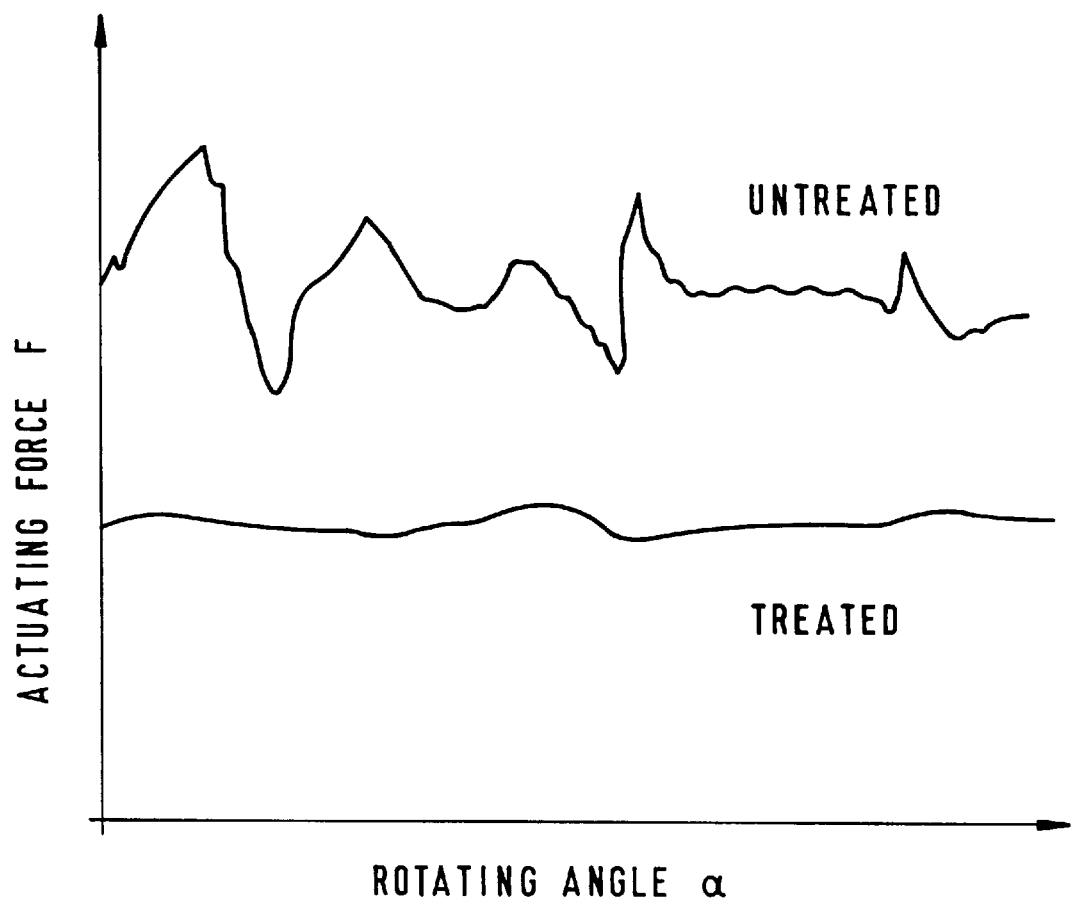
FIG. 10 shows a comparison of the actuating forces for swivelling a reflecting telescope including untreated rolling bearings and including rolling bearings which have been surface-treated according to the method of the invention.

FIG. 10 illustrates the actuating force F to be applied by a drive motor for adjusting the reflecting telescope about the axis 16 in response to the swivelling angle α, the upper graph reflecting the actuating forces F to be applied in the case of an untreated bearing arrangement and the lower graph in FIG. 10 reflecting the actuating forces to be applied in the case of a bearing subjected to surface-treatment.

Accordingly, the actuating force F to be applied is considerably lower when using a bearing arrangement pretreated according to the invention than the force F which has to be applied to an untreated bearing. Moreover, the actuating force F shows very high variations for the untreated bearing which are dependent on the swivelling angle a so that an exact positioning of the mirror 12 can only be performed with great efforts in the field of control engineering. Compared to this, in the case of the bearing arrangement subjected to a surface-treatment an almost constant force F has to be applied over the entire swivelling range α, whereby the positioning accuracy is considerably increased vis-à-vis the conventional solution.

Due to the lower actuating force F the reflecting telescope provided with a surface-treated bearing arrangement can be brought into its desired swivel position by far more quickly so that the handling of the telescope is easier. As an alternative to that, for the same actuating speeds servomotors having a lower capacity than in the conventional reflecting telescope arrangements can be employed so that the investment costs for the telescope can be minimized.

Another field of application of the method according to the invention is the pretreatment of punching tools so that the latter are suited for machining even materials having no or only little punching quality, such as, e.g., uranium, nickel etc.

Further fields of application of the invention reside in the treatment of pump components, for instance the running faces of a pump casing, the delivery or piston member and the sealing elements being pretreated by the method according to the invention. First tests have shown that particularly good results can be obtained, if the pump casing and the piston member are manufactured of an Al alloy having an Si content of less than 13 %. The sealing elements may consist of common material such as, for instance, rubber or a polymer.

Figure 12:
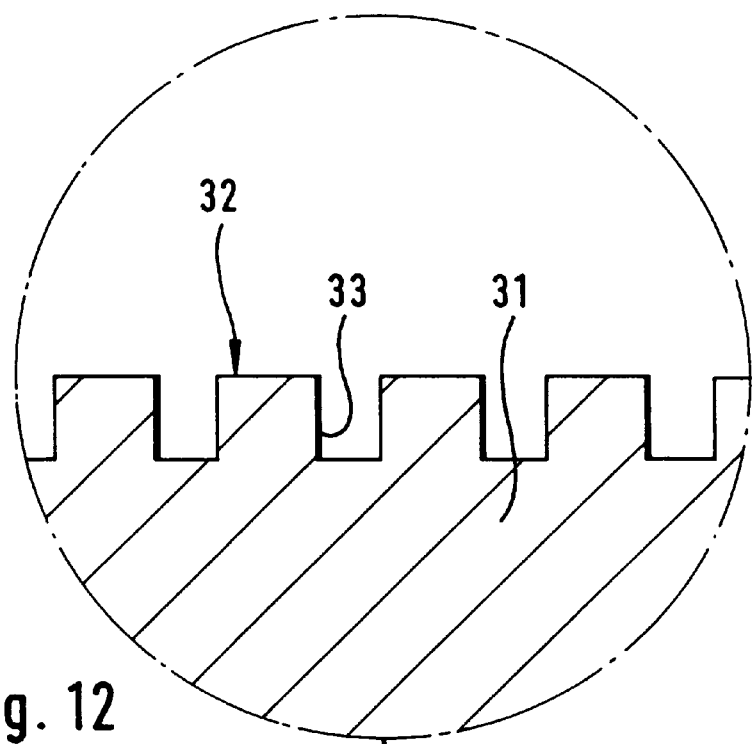
FIGS. 11 and 12 show a cup tappet particularly suited for the method according to the invention.
Figure 11:
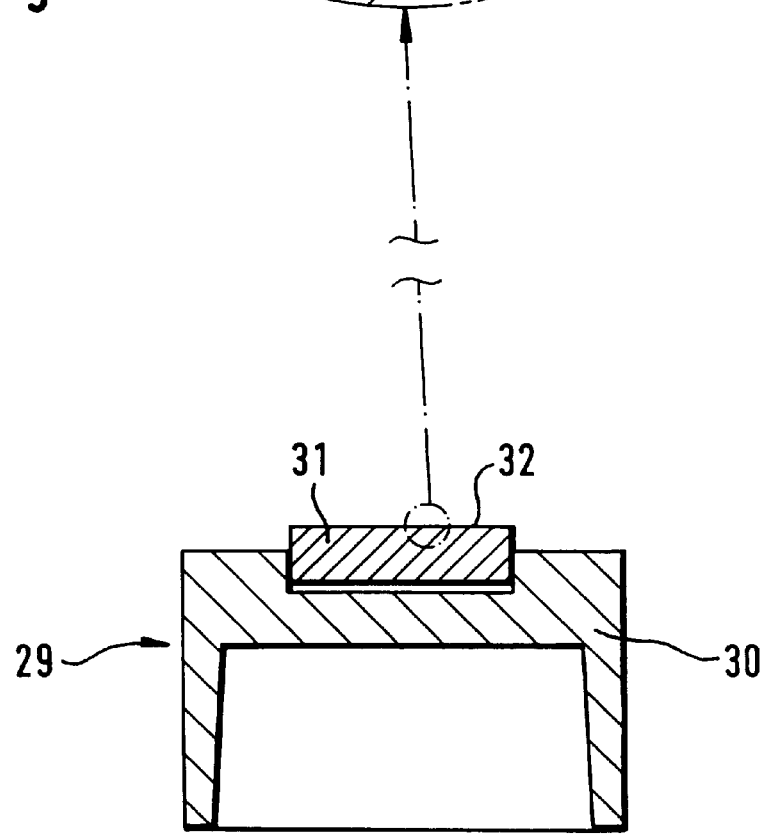

In FIGS. 11 and 12 another application of the method according to the invention is shown. FIG. 11 illustrates a section across a cup tappet 29 comprising a support member 30 which is provided with a wearing insert 31. The support member 30 consists of an aluminum alloy and the insert 31 consists of hardened steel (for instance 45 HRC) and a predetermined roughness. In order to enlarge the attaching surface recesses 33 (FIG. 12) in which an additional "ion/molecule reservoir" can become attached are formed on the surface 32 of the insert. The recesses 33 may be introduced, for example, by a laser (e.g. an infrared laser).

Figure 13:
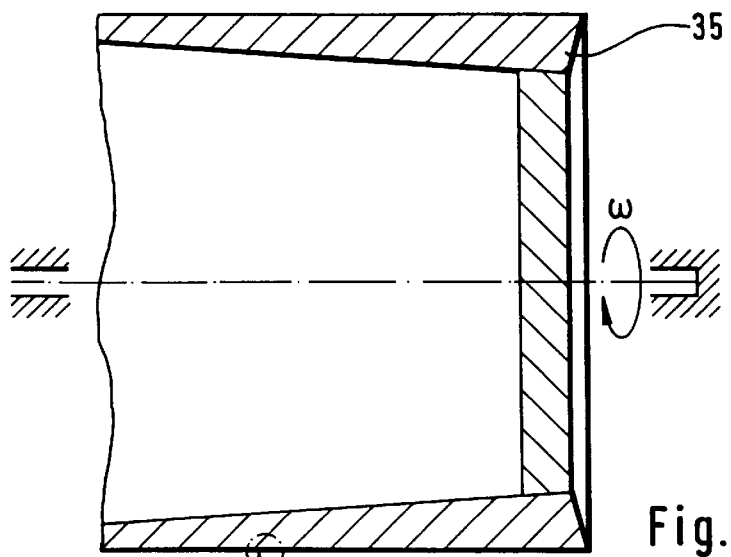
FIGS. 13 and 14 show a piston of an internal combustion engine which is particularly suited for the method according to the invention.
Figure 14:
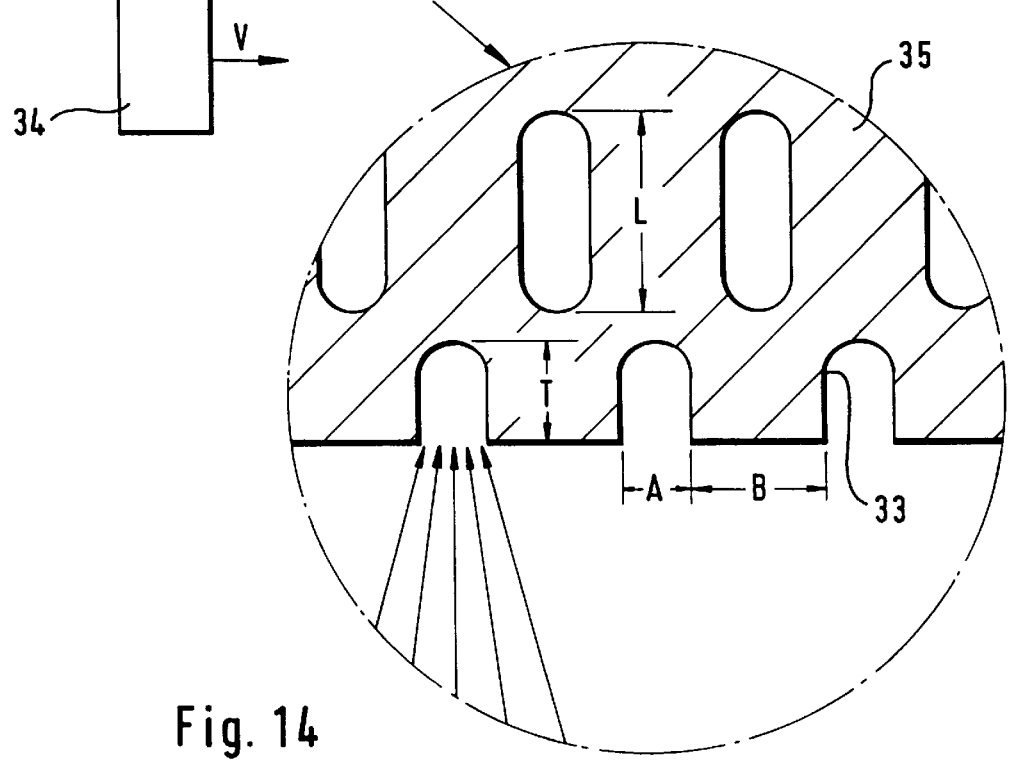

FIGS. 13 and 14 show a similar example of application in which a piston 35 of an Al alloy can be provided with a recess pattern for enlarging the attaching faces. The recesses 33 have a width A of approx. 1000 nm to 100 μm, a depth T of approx. 200 μm to 0.8 mm. The length L and the distance B can be appropriately selected. The recess pattern is introduced in that the piston 35 is supported rotatably about its longitudinal axis and a laser 34 is directed to the case surface of the piston 35 so that, depending on the pulse performance and duration, the rotating speed of the piston 35 and the axial thrust V (laser 34 or piston 35), the predetermined recess pattern can be formed. This surface is subsequently pretreated in accordance with the method of the invention, wherein by the recesses 33 also lubricant pockets are formed so that the "self-healing" of worn faces is facilitated by the attachment of ions/molecules out of the pockets. The piston 35 can be designed with or without a cast-in steel ring for receiving a sealing ring.

There is disclosed a method of treating running faces of a workpiece subjected to wear in which ions of molecule chain components of fluorocarbon molecules are disposed on the surface of the workpiece. In an especially preferred case ions of polyfluoroether molecules are attached. The attachment can be effected by adhesion or by chemical bonding. In principle, the method according to the invention can be applied to metallic and ceramic materials, wherein especially good experiences have been made with the surface treatment of aluminum workpieces, of ceramic inserts etc.

Patent application DE 19634859.5-45 filed Aug. 28, 1996, is incorporated herein by reference.

What is claimed as new and desired to be secured by Letters Patent of the United States of claims:

1. A method of treating a surface of a substrate, comprising the step of chemically or physically attaching ions of fluorocarbon molecules in an ion or molecule layer to the surface of the substrate.

2. A method as set forth in claim 1, wherein ions of the type $C_mF_n^+(m, n \geq 1)$ and $C_aF_bO_c^-, (a,b,c \geq 1)$ are attached to the surface of the substrate.

3. A method as set forth in claim 1, wherein the fluorocarbon molecules are polyfluoroether molecules of the formula —$CF_2CF_2)O(CF_2CF_2$)— optionally having O and/or H groups provided at side chains.

4. A method as set forth in claim 1, wherein attachment is effected by chemical bonding or by adhesion.

5. A method as set forth in claim 1, wherein a shearing force is applied to the treated surface of the substrate after the ions have become attached.

6. A method as set forth in claim 1, wherein a cleaning step and/or a drying step and/or a plasma-etching step is performed before the attaching step.

7. A method as set forth in claim 1, wherein the ions of fluorocarbon molecules are attached in diluted form.

8. A method as set forth in claim 7, wherein a polyfluoroether is added to an inert carrier gas and ionized in a plasma chamber in which the substrate is received.

9. A method as set forth in claim 8, characterized in that the carrier gas is selected from the group of $N_2$, $CO_2$, $CH_4$, $O_2$ or an inert gas and the ionized gas acts on said workpiece for about 1 to 60 minutes, wherein in said plasma chamber a pressure of less than 1 bar and a temperature of more than 20° C. are prevailing.

10. A method as set forth in claim 1, wherein the fluorocarbon molecule is not soluble in a lubricant.

11. A method as set forth in claim 10, characterized in that a lubricant additive is added to the lubricant by which lubricant additive the fluorocarbon molecule or ion can be detached from the surface of the workpiece and can be attached to the surface of the workpiece again.

12. A substrate comprising a surface pretreated according to the method as set forth in claim 1, wherein said substrate is made of an aluminum alloy and the surface is a sliding or running face.

13. A substrate as set forth in claim 12, characterized in that the aluminum alloy has a Si content of less than 13%.

14. A substrate comprising a surface pretreated according to the method as set forth in claim 1, wherein the substrate is a mirror the reflection layer of which has been subjected to a surface-treatment.

15. A substrate comprising a surface pretreated according to the method as set forth in claim 1, wherein the substrate is a surface of a rolling bearing the rolling members of which have been subjected to a surface-treatment.

16. A substrate comprising a surface pretreated according to the method as set forth in claim 1, wherein a lubricant additive is additionally present by which the fluorocarbon molecule or ion can be detached and can again be attached to said surface during a lubricating operation.

17. A substrate treated according to the method of claim 1, wherein recesses are formed on the surface of the substrate.

18. The method of claim 1, wherein said ions fluorocarbon molecules are selected from the group consisting of $C_2F^+$, $CF_3^+$, $C_2F_4^+$, $C_2F_5^+$, $C_3F_5^+$, $C_3F_6^+$, $C_3F_7^+$, $CFO^-$, $CF_3O^-$, $C_2F_3O_2^-$, $C_3F_5O^-$, and $C_3F_5O_2^-$.

19. A method as set forth in claim 1, wherein said substrate is a metallic material.

20. A method as set forth in claim 1, wherein said substrate is a ceramic material.

21. A substrate comprising a surface pretreated according to the method of claim 1, wherein said substrate is a metallic material.

22. A substrate comprising a surface pretreated according to the method of claim 1, wherein said substrate is a ceramic material.

* * * * *